United States Patent
Nakajima

(10) Patent No.: US 11,338,620 B2
(45) Date of Patent: May 24, 2022

(54) TIRE

(71) Applicant: SUMITOMO RUBBER INDUSTRIES, LTD., Hyogo (JP)

(72) Inventor: Koichi Nakajima, Hyogo (JP)

(73) Assignee: SUMITOMO RUBBER INDUSTRIES, LTD., Hyogo (JP)

( * ) Notice: Subject to any disclaimer, the term of this patent is extended or adjusted under 35 U.S.C. 154(b) by 499 days.

(21) Appl. No.: 16/386,501

(22) Filed: Apr. 17, 2019

(65) Prior Publication Data

US 2019/0344623 A1    Nov. 14, 2019

(30) Foreign Application Priority Data

May 10, 2018   (JP) .............................. JP2018-091578

(51) Int. Cl.
    B60C 11/13     (2006.01)

(52) U.S. Cl.
    CPC ... B60C 11/1323 (2013.01); *B60C 2011/1338* (2013.01)

(58) Field of Classification Search
    CPC ............... B60C 11/1323; B60C 11/042; B60C 11/0323; B60C 11/0304; B60C 11/0309; B60C 11/1307
    See application file for complete search history.

(56) References Cited

U.S. PATENT DOCUMENTS

| | | | |
|---|---|---|---|
| 2,869,609 A * | 1/1959 | Balzhiser | B60C 11/0309 152/900 |
| 4,840,211 A | 6/1989 | Makino | |
| 2010/0200134 A1 | 8/2010 | Murata | |
| 2020/0070586 A1 * | 3/2020 | Ocana Amezcua ... | B60C 11/047 |

FOREIGN PATENT DOCUMENTS

| JP | 1999123909 A | | 5/1999 |
|---|---|---|---|
| JP | 2003-146024 | * | 5/2003 |
| JP | 2009-40156 A | | 2/2009 |
| JP | 2013-147115 | * | 8/2013 |
| JP | 2013-147115 A | | 8/2013 |
| JP | 2014196084 A | | 10/2014 |
| JP | 2017109636 A | | 6/2017 |

OTHER PUBLICATIONS

English machine translation of JP2017-109636. (Year: 2017).*
English machine translation of JP11-123909. (Year: 1999).*
English machine translation of JP2003-146024. (Year: 2003).*
European Search Report, European Patent Office, Application No. 19168074.3, dated Aug. 13, 2019, 8 pages.

* cited by examiner

*Primary Examiner* — Robert C Dye
(74) *Attorney, Agent, or Firm* — Greenblum & Bernstein, P.L.C.

(57) ABSTRACT

A tire having a tread portion provided with a circumferential groove. Of the opposite groove side walls of the circumferential groove, at least one groove side wall to be positioned on the inside of a vehicle is provided with a lower side wall portion extending from a groove bottom, and a protruding portion extending from the lower side wall portion to have a radially outer edge. The protruding portion protrudes toward the groove widthwise center from a reference line X defined by a radially outwardly extended line from the lower side wall portion. The protruding portion comprises a sloped portion extending obliquely from the radially outer edge to the tread surface.

15 Claims, 5 Drawing Sheets

TIRE

TECHNICAL FIELD

The present invention relates to a tire capable of improving steering stability while suppressing uneven wear.

BACKGROUND ART

It has been proposed to provide a chamfer (c) at an intersection (j) where groove side walls (a1) of a circumferential groove (a) intersect with the tread surface (b) as shown in FIG. 5. (see, for example, Patent Document 1) Such chamfer (c) cuts off the corner formed at the intersection (j) which is liable to become a starting point of wear, and thereby can suppress uneven wear such as so called rail wear. Such chamfer (c) however, has a problem that the ground contact area is reduced and thereby steering stability is liable to deteriorate.

Patent Document 1: Japanese Patent Application Publication No. 2009-40156

SUMMARY OF THE INVENTION

Problems to be Solved by the Invention

It is therefore, an object of the present invention is to provide a tire which is capable of improving steering stability, especially that during cornering including lane change, while suppressing the above-mentioned uneven wear.

According to the present invention, a tire comprises a tread portion provided in its tread surface with a circumferential groove, the circumferential groove extending continuously in the tire circumferential direction, and having a groove bottom, an inside groove side wall extending radially outwardly from the groove bottom to be positioned on the inside of a vehicle when the tire is mounted thereon, and an outside groove side wall extending radially outwardly from the groove bottom to be positioned on the outside of the vehicle, wherein in the cross section of the circumferential groove perpendicular to the longitudinal direction thereof, at least the inside groove side wall comprises

- a lower side wall portion extending radially outwardly from the groove bottom, and
- a protruding portion extending radially outwardly from the lower side wall portion to have a radially outer edge, while protruding from a reference line defined by a radially outwardly extended line from the lower side wall portion, and the protruding portion comprises a sloped portion extending obliquely from the radially outer edge to the tread surface.

The tire has a specified mounting orientation when the tire is mounted on a vehicle.

It is preferable that the intersection where the sloped portion intersects with the tread surface is located on the outer side of the reference line with respect to the circumferential groove.

It is preferable that the radial distance LA from the tread surface to the radially outer edge of the protruding portion is in a range from 2% to 40% of the groove depth H of the circumferential groove.

It is preferable that the protruding portion is provided on the inside groove side wall, and not provided on the outside groove side wall.

It is preferable that the sloped portion is provided with serrations.

In the tire according to the present invention, the protruding portion is provided with the sloped portion which extends from the radially outer edge of the protruding portion to the tread surface, therefore the occurrence of uneven wear is suppressed by the sloped portion.

At the time of cornering, the tire is subjected to a lateral G, and, from the road surface, a lateral force toward the inside of the vehicle is applied to the tread portion. Due to such lateral force, the land portion is deformed toward the inside of the vehicle, and a part of the sloped portion further contact with the ground. Thereby, the ground contact area is increased to enhance the grip performance, and the steering stability can be improved.

The reference line corresponds a groove side wall line of a conventional circumferential groove.

In the case of the conventional groove side wall extending along the reference line, the ground contact area is reduced by forming a chamfer, and even if the chamfer comes in contact with the ground due to the deformation of the land portion by the lateral force at the time of cornering, the ground contact area merely returns to that before the formation of the chamfer. Thus, it is difficult to achieve improvement in the steering stability.

According to the present invention, the protruding portion protrudes toward the groove's widthwise center from the reference line (namely, the conventional groove side wall line). As a result, the ground contact area can be reliably increased when applied by the lateral force at the time of cornering, and the steering stability can be improved.

DESCRIPTION OF THE PREFERRED EMBODIMENTS

The present invention can be applied to various tires such as pneumatic tires for passenger cars and heavy loads, as well as non-pneumatic tires, and suitably applied to pneumatic tires.

Taking a pneumatic tire as an example, embodiments of the present invention will now be described in detail in conjunction with accompanying drawings.

In this embodiment, the tire 1 according to the present invention is a pneumatic tire for a passenger car.

The tire 1 has a specified mounting orientation when the tire is mounted on a vehicle. In other words, which tire sidewall portion is to be located on the outside or inside of the vehicle is specified.

The tire 1 comprises a tread portion 2 having a tread surface 2S contacting with the ground, and provided with a tread pattern (not shown). The tread pattern may be an asymmetrical pattern bound with the specified mounting orientation. Incidentally, the mounting orientation on a vehicle is indicated, for example, by characters and/or marks in a tire sidewall portion (not shown) or the like.

The tread portion 2 is provided with at least one circumferential groove 3 extending circumferentially of the tire, whereby the tread portion 2 is axially divided into a plurality of land portions 4.

Figure 1:
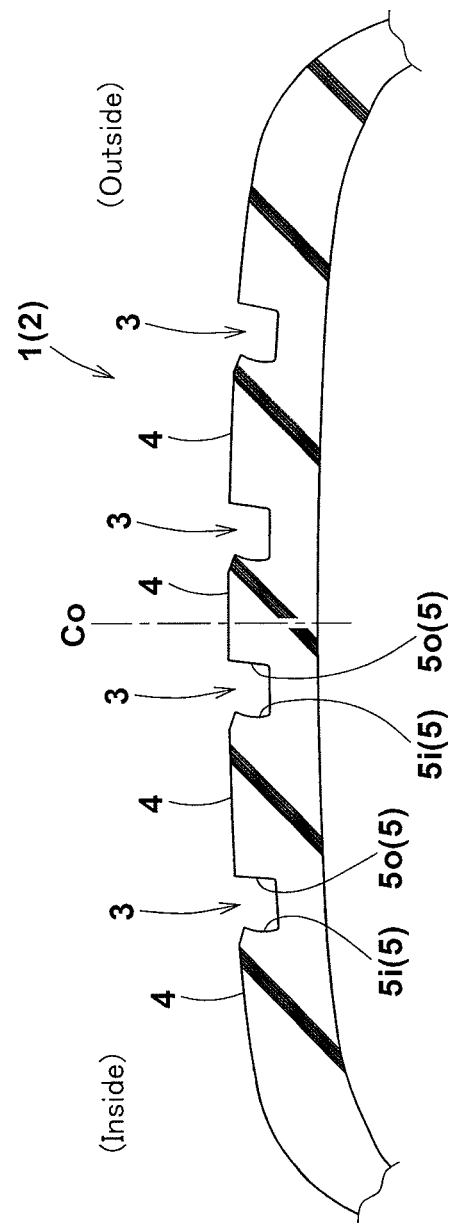
FIG. 1 is a schematic cross-sectional view of a tread portion of a tire as an embodiment of the present invention.

As shown in FIG. 1, in this example, a plurality of (for example, four) circumferential grooves 3 are disposed in the tread portion 2, and the tread portion 2 is thus divided into five land portions 4.

Each land portion 4 may be a rib extending continuously in the tire circumferential direction, or may be a row of blocks.

In the present example, the above-said at least one circumferential groove 3 is a straight groove extending straight in the tire circumferential direction. However, as the circumferential groove 3, a zigzag groove extending zigzag in the tire circumferential direction can be used. In the case of a plurality of the circumferential grooves 3, a mixture of a straight groove and a zigzag groove may be used.

The groove width and the groove depth of the circumferential groove 3 may be appropriately set according to the conventional manner.

Figure 2:
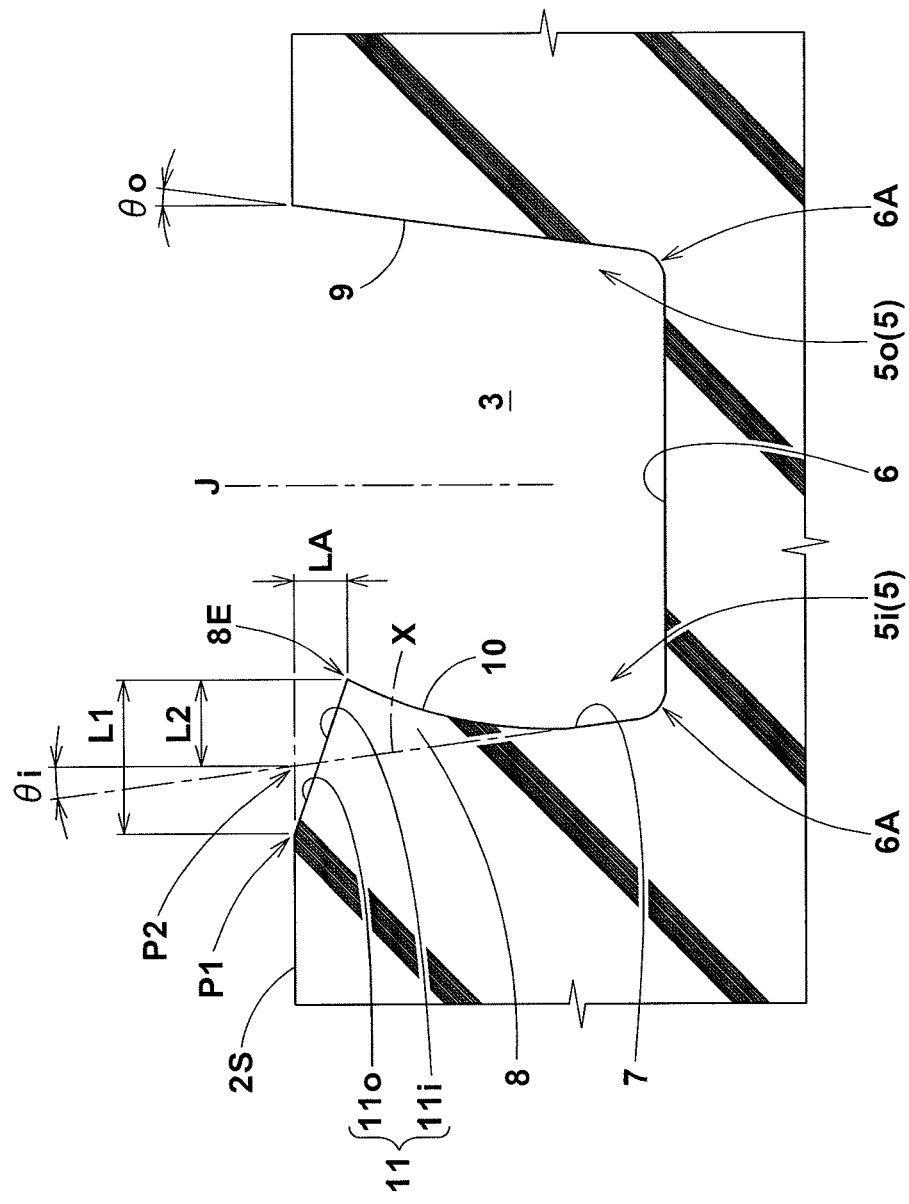
FIG. 2 is a cross-sectional view of the circumferential groove taken perpendicularly to the longitudinal direction of the circumferential groove.

FIG. 2 shows the cross-section of the above-said at least one circumferential groove 3 perpendicular to the longitudinal direction of the groove.

As shown, the circumferential groove 3 has a pair of opposite groove side walls 5 on both sides in the tire axial direction, and a groove bottom 6 joining the pair of groove side walls 5. In this example, the groove bottom 6 has arc portions 6A at both ends thereof in the groove widthwise or tire axial direction in order to smoothly connect between the groove bottom 6 and the groove side walls 5.

Of the opposite groove side walls 5 on both sides, at least one groove side wall which becomes inside of a vehicle on which the tire 1 is mounted (hereinafter, referred to as the inside groove side wall 5i) is provided with a protruding portion 8.

The groove side wall which becomes outside of the vehicle (hereinafter, referred to as the outside groove side wall 5o) is, in this example, not provided with the protruding portion 8, and formed as an inclined surface 9 extending from the groove bottom 6 to the tread surface 2S at a constant inclination angle θo.

In the case where a plurality of circumferential grooves 3 is provided as in the present embodiment shown in FIG. 1, it is preferable that each of the circumferential grooves 3 is provided with the inside groove side wall 5i and the outside groove side wall 5o configured as described above.

The inside groove side wall 5i comprises a lower side wall portion 7 extending radially outwardly from the groove bottom 6, and
a protruding portion 8 extending radially outwardly from the radially outer edge of the lower side wall portion 7.

The lower side wall portion 7 in this example extends obliquely from one of the arc portions 6A of the groove bottom 6 at a constant inclination angle θi.

The angles θo and θi are defined as angles with respect to the normal direction to the tread surface 2S in the cross section of the circumferential groove perpendicular to the longitudinal direction thereof.

The protruding portion 8 has a radially outer edge 8E which protrudes toward the inside of the groove (namely, toward the groove widthwise center line J) from a reference line X which is a radially outward extension of the lower side wall portion 7 in the above-said cross section.

such a reference line X corresponds to a conventional groove side wall line.

In this example, the reference line X is substantially line symmetrical with the outside groove side wall 5o (inclined surface 9) about the widthwise center line J in the above-said cross section. Here, the expression "substantially line symmetrical" includes not only exact line symmetry but also such a case that the angle difference |θi−θo| is not more than 5 degrees.

It is preferable that, from the radially outer edge 8E to the radially outer edge of the lower side wall portion 7, the protruding portion 8 is formed by a concave curve 10 of a circular arc whose center is positioned on the inside of the groove in the above-said cross section. But, it is also possible that the protruding portion 8 is formed by a straight line inclined at a constant angle.

The protruding portion 8 comprises a sloped portion 11 which extends obliquely from the radially outer edge 8E to the tread surface 2S.

In this example, the intersecting point P1 at which the sloped portion 11 intersects with the tread surface 2S is located on the outside of the reference line X of the groove, namely, on the opposite side to the widthwise center line J.

Thus, the sloped portion 11 is virtually divided by the reference line X into a surface area 11o on the outside and a surface area 11i on the inside of the reference line X with respect to the groove.

In the above-said cross section, when an intersecting point P2 is defined as that of the reference line X and an extension line of the tread surface 2S extended toward the groove widthwise center (J) from the intersecting point P1, the axial distance L2 between the intersecting point P2 and the radially outer edge 8E is preferably set in a range from 0.2 to 0.8 times the axial distance L1 between the intersecting point P1 and the radially outer edge 8E.

Further, the radial distance LA from the tread surface 2S to the radially outer edge 8E is preferably set in a range from 2% to 40% of the groove depth H of the circumferential groove 3.

Figure 3A:
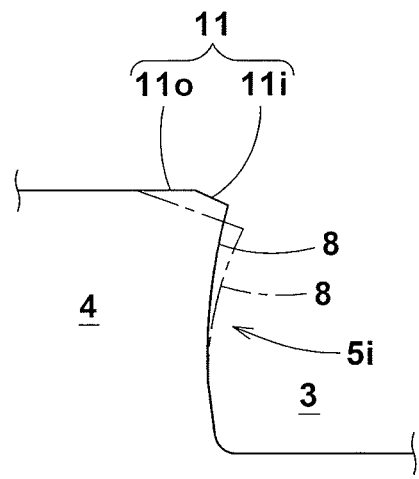
FIGS. 3(A) and 3(B) are diagrams for explaining the function of the protruding portion.

In the tire 1 of the present embodiment, when running straight, the land portion 4 is deformed by the vertical tire load applied to the tire 1 as shown in FIG. 3A, and a part (particularly the outside surface area 11o) of the sloped portion 11 can contact with the ground. As a result, it possible to secure a ground contacting area almost equal to that of a land portion defined by the conventional circumferential groove of which groove side wall is formed along the above-said reference line X. At this time, the ground contact pressure becomes relatively low in the vicinity of the outside surface area 11o, so the ground contact pressure of the land portion 4 can be made uniform, and uneven wear can be suppressed.

Figure 3B:
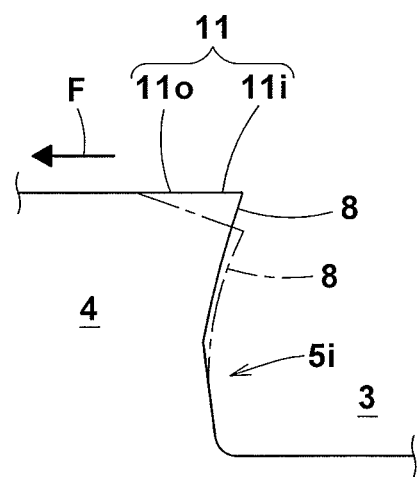

During cornering, on the other hand, the tire 1 is subjected to a lateral G, and further, from the ground, a lateral force F toward the inside of the vehicle is applied to the tire as shown in FIG. 3(B). Due to such lateral force F, the land portion 4 is deformed toward the inside of the vehicle, and the inside surface area 11i can further contact with the ground. Thereby, the ground contacting area is increased, and the grip performance is increased. As a result, the steering stability can be improved.

Further, in the vicinity of the outside and inside surface areas 11o and 11i, the ground contact pressure becomes relatively low, so the ground contacting pressure of the land portion 4 can be made uniform, and the occurrence of partial wear can be suppressed.

It is preferable for the tire 1 that, when the tire is in its reference state, the outside surface area 11o becomes in contact with the ground. For that purpose, it is preferred to appropriately set the distances LA, L1 and L2 according to the physical properties of the tread rubber, the groove depth H and the like. Although not limited, in the case of a pneumatic tire for a passenger car, the above-mentioned ranges are suitably adopted for the distances LA, L1 and L2.

Here, the reference state is such that the tire is mounted on a normal rim, inflated to a normal pressure and loaded with a normal tire load.

The normal rim is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used.

The normal pressure and the normal tire load are the maximum air pressure and the maximum tire load for the tire specified by the same organization in the Air-pressure/Maximum-load Table or similar list.

For example, the normal wheel rim is the "standard rim" specified in JATMA, the "measuring Rim" in ETRTO, the "Design Rim" in TRA or the like. The normal tire pressure is the "maximum air pressure" in JATMA, the "Inflation Pressure" in ETRTO, the maximum pressure given in the "Tire Load Limits at various Cold Inflation Pressures" table in TRA or the like. In case of passenger car tires, however, the normal tire pressure is uniformly defined by 180 kPa. The normal tire load is the "maximum load capacity" in JATMA, the "Load Capacity" in ETRTO, the maximum value given in the above-mentioned table in TRA or the like.

In the cross section of the circumferential groove, the sloped portion 11 in this example is formed by a straight line inclined at a constant angle. But, the sloped portion 11 may be formed by a convex curve such as an arc whose center is located on the inside of the tire, or a combination of such curve line and a straight line.

Figure 4:
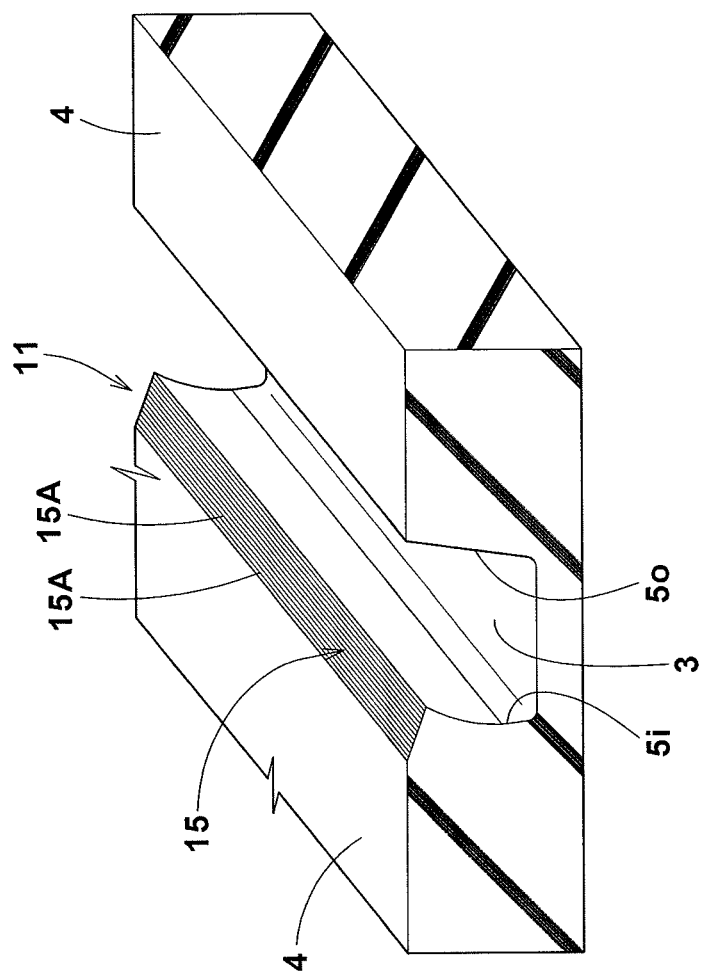
FIG. 4 is a perspective view showing serrations formed in the sloped portion.
Figure 5:
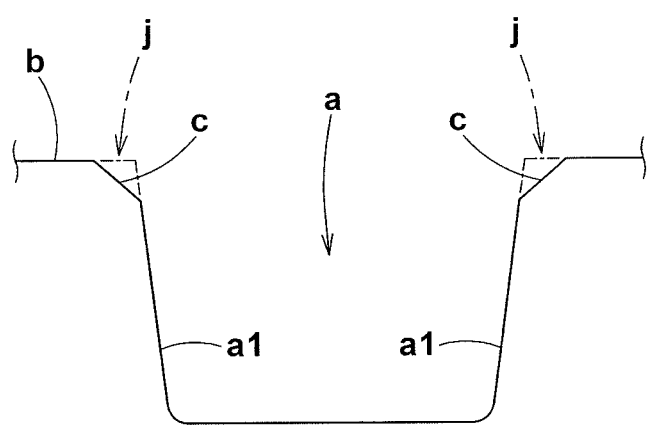
FIG. 5 is a cross-sectional view showing a circumferential groove provided with conventional chamfered portions.

As shown in FIG. 4, the surface of the sloped portion 11 is preferably provided with serrations 15. The serrations 15 are formed by parallel ridges 15A. Preferably, the ridges 15A extend along the longitudinal direction of the circumferential groove. But, it is also possible to incline the ridges 15A with respect to the longitudinal direction of the circumferential groove.

According to the present invention, it is also possible that the outside groove side wall 5o is provided with the same structure as described above in connection with the inside groove side walls 5i.

While detailed description has been made of an especially preferable embodiment of the present invention, the present invention can be embodied in various forms without being limited to the illustrated embodiment.

Comparison Tests

Pneumatic tires of size 215/60R16 (rim size 16×7.0 J) for passenger cars having a five-rib tread pattern shown in FIG. 1 were manufactured as test tires (practical examples Ex.1 and Ex.2 and comparative example Ref.1) by changing the configuration of the groove side walls as shown Table 1, and tested for the steering stability and uneven wear resistance. In the comparative example Ref.1, the groove side walls were formed only with the inclined surfaces along the reference lines. The common specifications to the test tires are as follows.

Depth H of circumferential grooves: 10 mm
Width of land portions (circumferential ribs): 20 mm In Table 1, the tread rubber hardness means a durometer A hardness measured at a temperature of 23 degrees C. according to Japanese industrial standard K6253.

<Steering Stability Test>

The test tires were mounted on all wheels of a 2400 cc minivan as test car (tire pressure 250 kPa). And during making high-speed running on a dry asphalt road, the test driver evaluated the steering stability at the time of making lane changes (lateral G was 0.2 G).

The results are indicated in Table 1 by an index based on Ref. 1 being 100, wherein the larger the value, the better the steering stability.

<Uneven Wear Resistance Test>

Using the above-mentioned test car, after running for 3000 km on a dry asphalt road surface of a test course, the intersections of the groove side walls of the circumferential grooves and the tread surface were visually checked whether uneven wear (rail wear) occurred or not.

The results are indicated in Table 1.

TABLE 1

| Tire | Ref. 1 | Ex. 1 | Ex. 2 |
| --- | --- | --- | --- |
| inside groove side wall | | | |
| protruding portion | absent | present | present |
| distance LA (mm) | — | 0.5 | 0.3 |
| sloped portion | absent | present | present |
| distance L1 (mm) | — | 2.0 | 1.7 |
| distance L2 (mm) | — | 1.0 | 0.8 |
| tread rubber hardness | 61 | 61 | 65 |
| steering stability | 100 | 106 | 106 |
| uneven wear | present | absent | absent |

Through the test, it was confirmed that the tires according to the present invention were improved in the steering stability while suppressing the occurrence of rail wear (uneven wear). Further, from the comparison between Ex. 1 and Ex. 2, it was confirmed that although they were different in the tread rubber hardness, the same effect could be obtained by adjusting the distances LA, L1 and L2.

DESCRIPTION OF THE REFERENCE SIGNS 1 tire
2 tread portion
2S tread surface
3 circumferential groove
5 groove side wall
5i inside groove side wall
5o outside groove side wall
6 groove bottom
7 lower side wall portion
8 protruding portion
8E radially outer edge
11 sloped portion
15 serration
P1 intersecting point
X reference line

The invention claimed is:

1. A tire comprising:
a tread portion provided in its tread surface with a circumferential groove, the circumferential groove extending continuously in the tire circumferential direction, and having a groove bottom, an inside groove side wall extending radially outwardly from the groove bottom and intended to be positioned on the inside of a vehicle when the tire is mounted thereon, and an outside groove side wall extending radially outwardly from the groove bottom and intended to be positioned on the outside of the vehicle, wherein in the cross section of the circumferential groove perpendicular to the longitudinal direction thereof, the inside groove side wall comprises a lower side wall portion extending radially outwardly from the groove bottom, and a protruding portion extending radially outwardly from the lower side wall portion to have a radially outer edge, while protruding from a reference line defined by a radially outwardly extended line from the lower side wall portion, the protruding portion comprising a sloped portion extending obliquely from the radially outer edge to the tread surface, and an intersection P1 at which the sloped portion intersects with the tread surface is located on an outer side of the reference line with respect to the circumferential groove, and wherein in the cross section of the circumferential groove perpendicular to the longitudinal direction thereof, the sloped portion is formed by a straight line inclined at a constant angle, and the protruding portion between the radially outer edge thereof and a radially outer edge of the lower side wall portion is formed by a concave curve.

2. The tire according to claim 1, wherein a radial distance LA from the tread surface to the radially outer edge of the protruding portion is in a range from 2% to 40% of the groove depth H of the circumferential groove.

3. The tire according to claim 1, wherein in the cross section of the circumferential groove perpendicular to the longitudinal direction thereof, when an intersecting point P2 is defined as that of the reference line and an extension line of the tread surface extended from the intersection P1 toward the widthwise center of the circumferential groove, an axial distance L2 between the radially outer edge of the protruding portion and the intersecting point P2 is in a range from 0.2 to 0.8 times an axial distance L1 between the radially outer edge of the protruding portion and the intersection P1.

4. The tire according to claim 3, wherein the protruding portion is provided on the inside groove side wall, and not provided on the outside groove side wall.

5. The tire according to claim 4, wherein the outside groove side wall is formed by an inclined surface extending from the groove bottom to the tread surface at a constant inclination angle θo in the cross section of the circumferential groove perpendicular to the longitudinal direction thereof.

6. The tire according to claim 5, wherein the lower side wall portion is inclined at a constant inclination angle θi which is substantially the same as the inclination angle θo of the outside groove side wall in the cross section of the circumferential groove perpendicular to the longitudinal direction thereof.

7. The tire according to claim 6, wherein the sloped portion is provided with serrations.

8. A tire comprising:

a tread portion provided in its tread surface with a circumferential groove, the circumferential groove extending continuously in the tire circumferential direction, and having a groove bottom, an inside groove side wall extending radially outwardly from the groove bottom and intended to be positioned on the inside of a vehicle when the tire is mounted thereon, and an outside groove side wall extending radially outwardly from the groove bottom and intended to be positioned on the outside of the vehicle, wherein in the cross section of the circumferential groove perpendicular to the longitudinal direction thereof, the inside groove side wall comprises a lower side wall portion extending radially outwardly from the groove bottom, and a protruding portion extending radially outwardly from the lower side wall portion to have a radially outer edge, while protruding from a reference line defined by a radially outwardly extended line from the lower side wall portion, the protruding portion comprising a sloped portion extending obliquely from the radially outer edge to the tread surface, and an intersection P1 at which the sloped portion intersects with the tread surface is located on the outer side of the reference line with respect to the circumferential groove, and wherein the circumferential groove is provided plurally, the protruding portion is provided on the inside groove side wall of each circumferential groove, and not provided on the outside groove side wall of said each circumferential groove, wherein the outside groove side wall is formed by an inclined surface extending from the groove bottom to the tread surface at a constant inclination angle, and the lower side wall portion of the inside groove side wall of each circumferential groove is inclined at a constant inclination angle which is substantially the same as the inclination angle of the outside groove side wall of the each circumferential groove.

9. The tire according to claim 8, wherein in the cross section of said each circumferential groove perpendicular to the longitudinal direction thereof, the sloped portion is formed by a straight line inclined at a constant angle, and the protruding portion between the radially outer edge thereof and a radially outer edge of the lower side wall portion is formed by a concave curve.

10. The tire according to claim 9, wherein a radial distance LA from the tread surface to the radially outer edge of the protruding portion is in a range from 2% to 40% of the groove depth H of the circumferential groove.

11. The tire according to claim 10, wherein in the cross section of said each circumferential groove perpendicular to the longitudinal direction thereof, when an intersecting point P2 is defined as that of the reference line and an extension line of the tread surface extended from the intersection P1 toward the widthwise center of the circumferential groove, an axial distance L2 between the radially outer edge of the protruding portion and the intersecting point P2 is in a range from 0.2 to 0.8 times an axial distance L1 between the radially outer edge of the protruding portion and the intersection P1.

12. The tire according to claim 11, wherein
in the cross section of said each circumferential groove perpendicular to the longitudinal direction thereof, the lower side wall portion is inclined at a constant inclination angle $\theta i$ which is substantially the same as the inclination angle $\theta o$ of the outside groove side wall.

13. The tire according to claim 12, wherein
in the cross section of said each circumferential groove perpendicular to the longitudinal direction thereof, the lower side wall portion is inclined at a constant inclination angle $\theta i$ which is substantially the same as the inclination angle $\theta o$ of the outside groove side wall.

14. The tire according to claim 13, wherein
the sloped portion of said each circumferential groove is provided with serrations.

15. The tire according to claim 8, wherein
the protruding portion is formed continuously along the length of the circumferential groove.

\* \* \* \* \*